United States Patent Office 3,251,786
Patented May 17, 1966

3,251,786
CORROSION RESISTANT EPOXY RESIN AGGREGATE COMPOSITIONS AND POROUS ARTICLE MADE THEREFROM
Alvin M. Edmunds, Midland, Mich., assignor to The Dow Chemical Company, Midland, Mich., a corporation of Delaware
No Drawing. Filed Dec. 13, 1961, Ser. No. 159,140
4 Claims. (Cl. 260—2.5)

The invention concerns an improved composition comprising a particulate aggregate bonded by a curable resin and a rigid porous article composed of said composition wherein the resin is in the cured state.

Particulate porous materials having desired physical properties, e.g., tensile strength, uniformly acceptable pore size, inertness to contacting materials, and bonded by cementitious material, have well established utility in a large number of processes. For example, such bonded particulate porous materials are used in the manufacture of filter media, of dispersing, sparging, and distributing plates for fluid flow, and of porous supports for columns of particulate fluid-contacting materials, e.g., ion-exchange, ion-exclusion, and chelating resins.

For porous compositions to be satisfactory for such uses, it is necessary that they possess certain physical properties to at least a minimum extent. Among such properties are substantial chemical inertness to substances with which they come in contact, practical resistance to breakage due to normal handling, rigidity and strength to serve as supports for other materials, acceptable pore size, low absorption of liquids and gases, resistance to erosion due to passage of liquids and gases therethrough, and acceptable dimensional stability during temperature fluctuations and during prolonged submergence in various liquids.

Known filter media and ion-exchange or ion-exclusion supports have been prepared by several procedures which include (1) admixing particles, e.g., $Al_2O_3$, and a ceramic binder, e.g., a specified clay, placing the resulting mixture in a mold, and subjecting it to heat, while under relatively high pressure, to form a rigid structure consisting of the particles bonded by the solidified ceramic; (2) incorporating sawdust or other combustible particulate solid with particles of an adhesive-coated aggregate (the adhesive having a relatively high ignition point), heating in a mold to harden the binder, and thereafter burning out the combustible solid; (3) coating an aggregate with a solvent containing a binder such as a lacquer, volatilizing off the solvent and oxidizing the lacquer; (4) curing a catalyzed liquid resin binder such as a phenol-formaldehyde resin or a furan-type resin and a specified catalyst intermixed with a particulate solid and a finely divided inorganic filler to produce a composition such as is described in U.S. Patents 2,670,338 and 2,670,339. The last above briefly described method offers a number of advantages over heretofore known methods and has, accordingly, heretofore usually been preferred. However, certain disadvantages are associated therewith among which are (1) the formation of pin holes or small voids in the resin due to the formation and escape of water as a result of the condensation reaction; (2) lower dielectric strength than is desirable; (3) a slower cure; (4) greater shrinkage during cure; (5) an undersirable tendency to swell when contacted by certain liquids; and (6) lower tensile strength than is often needed.

The present invention obviates the more serious disadvantages existent in porous structures prepared according to the heretofore preferred procedure described immediately above. The manner and means of attaining this end is made clear in the ensuing description.

The invention is a moldable settable composition comprising an intimate mixture of an aggregate, of a particle size such that at least about 90 percent pass through a 2.5 mesh sieve but not more than about 10 percent pass through a 140 mesh sieve, and an epoxy resin and suitably shaped rigid porous articles made by molding the composition in conformity with a desired shape and allowing it to harden or set. The mesh number as used herein always means the number of meshes per lineal inch according to the Tyler Standard Screen Scales Series.

It is preferred to employ, with the epoxy resin and aggregate, inorganic or inert organic solids, at least about 80 percent of which pass through a 140 mesh sieve and preferably that not over about 5 per cent are retained on a 100 mesh sieve and preferably that at least about 20 to 30 percent thereof pass through a 325 mesh. Such finely subdivided solids when employed thicken the resin binder, improve its tackiness and facilitate uniform mixing with the aggregate, increase the porosity of the composition and the amount added, therefore, facilitating control of the porosity thereof. Up to 65 percent by weight of such subdivided solids, e.g., powdered carbon, powdered graphite, silica flour, or $BaSO_4$, (based on the epoxy resin-filler binder) may be employed.

Although the aggregate and the filler may be the same type of material, they are predominantly of a different particle size and perform separate functions; the aggregate is of such size as to be bonded together by the epoxy resin whereas the filler is of such particle size as to serve as a thickener and viscosity-control agent in the uncured resin, and porosity-control agent in the cured composition. The filler is admixed with the resin prior to admixing the aggregate therewith.

The moldable settable composition of the invention offers the advantages of employing readily available ingredients of long shelf life and good fluidity and may be prepared conveniently and quickly, employing conventional equipment. It is easily worked at room temperature and permits accurate and speedy casting or molding of even the more intricate shapes. The composition cures or hardens within a few hours to a strong cross-linked resin-bonded aggregate at room temperature or, where a particularly fast set is desired, at a markedly fast setting rate at a slight elevation in temperature.

Among the outstanding advantages afforded by the cast or molded article of the invention are: (1) low-shrinkage during cure; (2) low swelling when immersed in water or exposed to air of high humidity; (3) improved corrosion resistance; (4) substantial absence of pin holes or capillaries in the resin; (5) high tensile strength; (6) unusually high electrical resistance thereby lessening corrosion of metal through electrolytic action thereof with electrically conductive particles in the porous article, e.g., corrosion of the steel supports or backing plates of a container when coke or other conductive material is employed in the porous article; (7) excellent dimensional stability; (8) lower adsorption or absorption of aqueous liquids; and (9) better rinse properties, due largely to the absence of voids, pin holes, or capillaries in the resin which inhibit drainage of liquids therefrom.

In carrying out the invention, a suitable catalyst, and filler or thickener (when employed), are admixed with the epoxy resin, the resulting admixture then admixed with the aggregate, and the settable composition thus made thereafter cast or otherwise formed into a suitable shape. Although the invention may be practiced without the use of the fine particle filler, the presence of such filler is highly advantageous for the reasons aforesaid.

The resin used in practicing the invention is any epoxy resin with which is admixed a suitable amount of a hardening (setting or curing) agent. The epoxy resin usually employed is the reaction product formed by admixing a diphenol, e.g., 4,4'-isopropylidenediphenol (known as bisphenol A) with a 4 to 10 molar excess of epichlorohydrin, while adding slowly thereto an aqueous solution of NaOH until a slight excess over the equivalent amount thereof, based on the diphenol, is provided. Epoxy resins, having an epoxide equivalent weight (the weight of resin necessary to yield one oxirane group), of between 174 and about 575 are recommended. D.E.R. 331, made according to the above general description and having an epoxide equivalent weight of between 187 and 193, is commonly employed. A discussion of the preparation and properties of epoxy resins, generally, is set out in Epoxy Resins by Lee and Neville, McGraw-Hill, New York (1957). Any of the hardening agents known to be effective to cure epoxy resins may be used, among which are amines (particularly the polyamines), polyamides, polycarboxylic acids and anhydrides thereof, amine-alkylene oxide adducts, cyanoethylation products, phenolic monomers and phenolic resins, polyesters containing reactive carboxylic groups, and Lewis acids and complexes thereof, e.g., $BF_3$ and $BF_3:(CH_5)_2O$ or $$BF_3:(C_2H_5OH)_2NH$$

Primary or secondary amines are usually employed. The polyamines (meaning herein those having more than two amine groups, e.g., diethylenetriamine and triethylenetetramine) are preferred over amine compounds having terminal amino groups only, such as ethylenediamine, because the polyamines, as here-defined, have higher boiling points and therefore are less likely to be driven off as a vapor during cure, are less toxic, and have a greater number of reactive amino hydrogens per molecule available for cross-linking with the oxirane groups of the epoxy resin.

Materials suitable for use as the aggregate in the practice of the invention may be any such material of suitable size and strength. Preferred materials are those of relatively light density which have a relatively rough and slightly absorbent surface. Pulverized calcined petroleum coke is illustrative of such material. Calcined petroleum coke is petroleum coke which has been heated at a temperature of between about 800° and 1500° C., usually between about 1100° C. and 1400° C., to remove volatiles therefrom. It has good strength and is resistant to corrosive attack by acidic and alkali materials. It is readily wetted and firmly bonded by the resin. Other materials suitable for use are pulverized silica, sand, quartz, aluminum oxide, brick chips, silicon carbide, ceramic materials, and naturally occurring inert mineral pebbles of suitable size.

The ratio of aggregate material to the settable resin to employ is an amount which forms a strong bond between the aggregate particles and yet provides interstitial spaces in the cured article, thereby to insure porosity. At least enough resin to wet the particles of aggregtae but less than that which completely fills the voids between the particles must be employed. The ratio to employ for a specific porous article depends on several factors among which are the intended end use, the character, density, and particle sizes of the aggregate, the extent and character of the smaller particle size filler employed, and the particular epoxy resin employed. The nature of the surface and the general shape of the aggregate particles affect the ratio to employ because a composition, employing aggregate composed of granular particles having a roughened and/or somewhat absorbent surface or which are of an oval or spherical shape, impart greater porosity at a given ratio of aggregate to epoxy resin than a composition employing relatively smooth surfaced, and/or angular particles.

The average size and distribution range of particle sizes also effect the ratio of resin to aggregate to employ. A wide range of particle size aggregate material may be employed so long as too great a proportion of the particles present are not so small as to result in such small interstices that, when wetted by the resin, the interstices are substantially plugged and the cured composition is thereby rendered insufficiently porous, or there are not present too great a proportion which are so large that accurate casting cannot be accomplished or too large pore sizes are provided. In selecting the aggregate and the amount to employ, it is well to have a screen analysis thereof and keep such analysis in mind. For example, when the particle sizes are substantially uniform, a percentage proportion by volume of between about 55 and 75 parts of the aggregate and between about 45 and 25 parts of the resin or resin plus filler may be employed. However if the aggregate consists of a more-or-less wide range of particle sizes (which is usually the case) the volume proportion of aggregate to resin may increase to a possible proportion of as high as about 92 parts of the aggregate to 8 parts of the resin.

The optimum amount of filler to employ is that which will impart to the resin fluidity and adhesive properties which permits of a continuous substantially uniform coating about the aggregate particles subsequently admixed therewith. Best results are obtained when a filler is employed in an amount sufficient to provide at least 40 percent by weight of the resulting epoxy resin-filler binder composition. When the filler employed is a fine grained organic material such as coke (which is relatively light in weight), the amount by weight is usually between about 40 and 65 percent of the resulting epoxy resin-binder composition. When the filler is an inorganic filler such as silica flour (which is relatively heavy), the amount by weight is usually between 50 and 85 percent of the resulting epoxy resin-filler binder composition.

The following sieve analysis (Tyler Screen Series) is illustrative of the particle sizes of various satisfactory aggregates:

| Meshes Per Lineal Inch | Sand [1] in wt. percent | Calcined Coke in wt. percent | | | | |
|---|---|---|---|---|---|---|
| | | #A | #B | #C | #D | #E |
| 5 | | | | | 3.6 | 4.15 |
| 10 | | | | | 73.0 | 22.50 |
| 20 | | 27.7 | 18.85 | 17.88 | 21.4 | 70.95 |
| 24 | | 47.5 | 23.00 | 22.17 | 2.0 | 2.40 |
| 32 | | 24.6 | 48.15 | 49.65 | | |
| 48 | 4.5 | 0.2 | 10.00 | 10.30 | | |
| 100 | 46.7 | | | | | |
| 140 | 43.1 | | | | | |
| Passed through 140 mesh | 5.7 | | | | | |

[1] Known commercially as No. 18 Graining Sand.

Calcined coke, due largely to its roughened surface and adsorbent properties, is preferred to be employed as the aggregate rather than the smoother sand. The above analyses are illustrative only and a wide range of other particle size distributions, within the broad description of the invention, may be employed.

A satisfactory test to employ for the purpose of ascertaining the suitable fluidity of the filler-thickened resin is that described in an article entitled "Cement for Oil Wells"

in Oil Well Weekly, vol. 94, pp. 18 to 22, 24 and 26 (August 28, 1939), by W. W. Robinson. This test consists essentially of placing a 1⅜" diameter, 2" high, metal open-end cylinder vertically and substantially centrally on a horizontal 10" x 10" glass plate and exactly filling the cylinder with a test sample (a catalyzed epoxy resin-filler composition). A time clock is started as the cylinder is pulled vertically upwardly from the plate allowing the sample to fall out through the lower open bottom of the cylinder and to spill out into a generally circular pattern or "patty" on the plate. Any remaining contents of the cylinder is substantially all quickly removed therefrom by a spatula and gently deposited on the center of the circular patty. Two diameters of the patty are measured at right angles to each other and averaged, at the end of each minute until 15 minutes have passed. At the end of 15 minutes an average diameter of between 2.5" and 10.0" for the epoxy resin-filler patty is satisfactory for use in the practice of the invention. However, an average diameter of between 3.0" and 7.0" is preferred.

In carrying out the invention, it is often more convenient to employ weights than volumes. This may be readily done so long as it is kept in mind that the weight ratio will necessarily vary in accordance with the density of the aggregate although the volume ratio remains substantially unchanged. For example, when powdered calcined coke is the aggregrate employed, which is of relatively low density, a weight percent of between about 40 and 80, preferably between about 50 and 70 thereof and the balance resin or filler-thickened resin is employed. When sand or aluminum oxide (either of which is of relatively high density) is the aggregate employed, the weight percent is usually between about 65 and 90, preferably between 80 and 85 percent and balance resin or filler-thickened resin.

To prepare the composition of the invention, the epoxy resin is placed in a suitable mixing vessel. A mixer comprising a horizontal mixing tub equipped with revolving vertical paddles, of which the Day-Pony mixer is illustrative, is quite satisfactory. A suitable curing agent, e.g., a primary, secondary, or tertiary aliphatic or aromatic amine is then admixed with the resin. Primary and secondary amines are usually employed in an amount sufficient to provide one amine hydrogen per oxirane group in the resin. When a tertiary amine is employed, it is usually added in an amount between 0.1 and 5 percent by weight of the epoxy resin present. The finely divided filler (if employed) is then added, rather rapidly, and as soon as it is substantially uniformly dispersed in the resin, the aggregate is admixed therewith. The preferred procedure for adding the aggregate is to add a first substantial portion of the resin, e.g., about ⅓ of the total, very rapidly, and after this portion has been melted or coated by the resin, add the remaining aggregate in two or three portions, allowing each portion to become substantially wetted or coated before adding the succeeding one.

Any suitable shaping means may be employed for molding the composition. It may be conveniently shoveled, poured or otherwise transferred from the mixer tub to open molds, care being taken to eliminate voids in the filled mold. The top of the mix in the mold is leveled to the desired height, as with a screed, or a vented platen or mold cover may be placed on the top of the resin mass, to compress the contents, if desired. The composition usually gels within 15–60 minutes, dependent upon the type and amount of hardening agent employed. Full cure is obtained within about 4–6 hours at room temperatures but the cure may be accelerated by heating to between 50° and 100° C.

A series of examples was run employing various resins, aggregate, fillers, and hardening agents. The procedure followed was to admix the resin, hardening agent, and filler and thereafter admix therewith the aggregate. The composition was then cast in 1" x 1" x 10" bars and cured at about 70° F. in 50 percent relative humidity air. Examples 1 and 2 are illustrative of the practice of the invention. Examples 3–5 are for comparative purposes only and do not illustrate the practice of the invention. The ingredients, amounts thereof, and comparative test results of the bars so made are set out in Table I below.

*Table I*

[Linear shrinkage of 1" x 1" x 10" bars per 10" length of bar]

| Ex. No. | Resin Type | Amt.[1] | Hardening Agent [2] | Filler Type | Amt.[1] | Aggregate Type | Amt.[1] | Swelling in Water [3] | Inches shrinkage [4] of bars during first 24 hrs. after curing | Additional inches shrinkage [4] after additional 180 days |
|---|---|---|---|---|---|---|---|---|---|---|
| 1 | Epoxy | 14.5 | D.E.T.[5] 1.19 | Powdered carbon | 19.31 | 5–10 mesh coke | 65 | 0.007 | 0.0007 | 0.0003 |
| 2 | ___do___ | 18.06 | D.E.T. 1.46 | ___do___ | 23.48 | ___do___ | 57 | 0.006 | 0.0029 | 0.0014 |
| 3 | 25% epoxy and 75% phenol-formaldehyde. | 17.5 | p-Toluene [6] sulphonic acid. | ___do___ | 17.5 | ___do___ | 65 | 0.005 | 0.0084 | 0.0276 |
| 4 | Phenol-formaldehyde. | 20.31 | Benzene [6]-chloride sulphonyl. | Powdered graphite | 20.21 | ___do___ | 57 | 0.060 | 0.0012 | 0.0140 |
| 5 | Polyester | 12.3 | Peroxide [6] | Finely divided silica. | 30.7 | ___do___ | 57 | 0.025 | 0.0007 | 0.0017 |

[1] All amounts are in parts by weight.
[2] The hardening agent was employed in an amount substantially equal to that necessary to yield functional groups equivalent to the functional groups in the resin except in Example 5 where a catalytic amount of about 1% by weight was used.
[3] Swelling or shrinkage was measured by submerging the 10 inch test bar in water at 70° F. for 84 days following 6 days' cure and measuring the linear expansion or contraction of the bar length in inches.
[4] 10" test bars were held at 70° F. in air of 50% relative humidity.
[5] D.E.T. is diethylenetriamine.
[6] A catalytic amount.

Reference to the table shows that a composition prepared according to the invention, as illustrated by Examples 1 and 2, exhibits greater stability, than the comparative samples (except the polyester), when subjected to 50 percent relative humidity air at 70° F. and when submerged in water at 70° F. for prolonged periods of time. Although the polyester employed shows a relatively low shrinkage, approaching that of the epoxy resin, it is not fully satisfactory for general use as explained in the following paragraph.

The polyester composition of necessity contains a diluent or solvent which does not cross-link with the catalyst but eventually evaporates or volatilizes leaving pin holes or capillaries in the cement coating around the bonded particles of aggregate. This condition is equivalent to the porosity due to water spilled out during the polymerization of phenol-formaldehyde resins and to that water which is initially present in the resin liquid before the polymerization.

The composition prepared according to Examples 1 and 2 were further tested by casting portions thereof into 2-inch thick circular discs, 4 inches in diameter, and placing them transverse to the flow of a 4 percent aqueous NaOH solution, thereby simulating use as supporting bases for a resin bed in an ion-exchange or ion-exclusion contacting column treating a caustic material. After a flow of NaOH solution through the discs had continued for about 1 hour, it was discontinued and each disc was rinsed by passing 6.54 to 10.38 gallons of water therethrough at the rate of 0.2 gallon per minute per square foot of disc area. The rinse water was periodically tested for electrical conductivity as a measurement of the NaOH content. The NaOH content of the rinse water showed the extent to which NaOH had been adsorbed or absorbed by the porous disc and indicates the difficulty of removing the thus adsorbed or absorbed NaOH from the disc. The following values in Table II show the results obtained:

*Table II*

|  | Gallons of Rinse Water per sq. ft. of Disc |  |  |  |  |
| --- | --- | --- | --- | --- | --- |
|  | 10 | 20 | 40 | 60 | 75 |
|  | Conductivity in micromhos |  |  |  |  |
| Rinse water from discs of Example 1 (employing composition of the invention) | 1.3 | 0.9 | 0.6 | 0.46 | 0.41 |
| Rinse water from discs of Example 3 (for comparative purposes) | 23.0 | 11.0 | 5.5 | 3.5 | 2.6 |

Reference to Table II shows that the amount of NaOH in the water used to rinse the discs employing epoxy resin in accordance with the invention contained appreciably less dissolved NaOH (as evidenced by the lower conductivity) than the water used to rinse the discs employing a mixed resin consisting of 75% phenol-formaldehyde and only 25% epoxy resin. This shows that the structure of the invention when in use adsorbs or absorbs much less of the chemicals dissolved in a contacting liquid, as illustrated by NaOH.

The compositions of Examples 2–5 were again prepared and also a composition of the invention, designated Example 6, following the same procedure as used in the Example 2 but employing 36.0 grams D.E.R. 331 epoxy resin, 2.94 grams of diethylene triamine and 64 grams of 140 mesh silica flour as the aggregate (instead of the coke there used).

For the purpose of ascertaining electrical properties, the compositions so made were cast into cylinders 2.25 inches long and 0.5 inch in diameter, having a 3/32 inch diameter copper wire embedded axially in the center thereof and extending about 0.5 inch out one end. A cylinder consisting of each of the resins so made, encasing the copper wire, and a ¼" polished metal rod were successively vertically positioned, 1 inch apart, on a raised insulated support on the bottom of a glass beaker. The metal rods employed with each cylinder were alternately steel and lead.

The beaker was successively filled with each of brines A and B, set out below, to such depth that the steel or lead rod and the cast resin cylinder being tested were covered with the liquid to a depth of 2¼".

The major components in weight percent (to the nearest 0.1%) of the brines were:

|  | Brine A | Brine B |
| --- | --- | --- |
| $CaCl_2$ | 19.0 | 42.4 |
| $MgCl_2$ | 3.6 | 5.5 |
| $KCl$ | 1.7 | 0.8 |
| $NaCl$ | 5.2 | 0.3 |
| $SrCl_2$ | 0.5 | 0.6 |

There were also present trace amounts of chloride salts of such other metals as Fe, Al, $NH_4$, and soluble sulfates, bromides, iodides, and borates of these and other metals in amounts sufficient to make 100 percent by weight.

The end of the copper wire extending out of the cylinder being tested and the steel rod were connected by a 14 gauge copper wire to a Leeds & Northrup potentiometer and the voltage ascertained. The difference in voltage between the copper electrode embedded in the resin cylinder and the steel or lead rod electrode was a means of measuring the electrolytic action resulting from the difference in electrical potential in the successive tests employing the steel or lead rod connected to the copper wire encased in the resin cylinder. The higher the voltage reading, the poorer the dielectric strngth of the resin employed. The results are set out in Table III below:

*Table III*

[Voltage (in volts) between metal rods and copper wire encased in cast resin cylinders]

| Resin Composition employed as Dielectric | In Brine A | In Brine B | |
| --- | --- | --- | --- |
|  | Steel Rod ¼" diameter | Steel Rod ¼" diameter | Lead Rod ¼" diameter |
| Example 2, illustrating the invention | 0.362 | 0.344 | (¹) |
| Example 3, for comparative purposes | 0.983 | 0.932 | 1.013 |
| Example 4, for comparative purposes | 0.896 | 0.850 | 0.912 |
| Example 5, for comparative purposes | 0.000 | 0.000 | (¹) |
| Example 6, illustrating the invention but employing silica flour filler in place of graphite powder filler | 0.000 | 0.000 | (¹) |

¹ Not determined.

Reference to Table III shows quite definitely that the electrolytic action between the steel or lead electrode and the copper embedded within the resin cylinder, is markedly greater when any of known resins other than epoxy (except the polyester of Example 4 shown to be otherwise unsatisfactory) was employed as the dielectric between the electrolyte and metal electrodes.

Additional examples, designated 7 to 23, were run to show the effect of employing decreasing proportions of the finely subdivided filler, until no filler was used, on tensile strength, density, permeability, and resistance to corrosion of aqueous solvents, of the article of the invention. Permeability tests were conducted on ½" thick discs cast from the composition of the invention. Water permeability is expressed in gallons of flow, per minute, per square foot of area, downwardly through the disc while maintaining a constant head of water of 12" (and of the diameter of the disc) positioned directly over the disc. Permeability to air is expressed in height (in inches) of water head as measured by a manometer connected to the disc, while maintaining air pressure on one face of the disc sufficiently great to equal exactly atmospheric pressure on the opposite face of the disc.

The procedure followed in preparing the additional examples was substantially the same as that employed in the preceding examples. The amounts of each of: epoxy resin, hardening catalyst, finely subdivided filler (when employed), and aggregate employed, together with the test results, are set out in Table IV.

Table IV

| Ex. No. | Composition of Mix in Percent by Weight ||||| Properties of ½″ Thick Discs ||||||
|---|---|---|---|---|---|---|---|---|---|---|---|
| | Epoxy Resin, D.E.R. 331 | DETA[1] Hardener | Filler, Graphite Powder of less than 140 mesh | Aggregate, 5-10 M Coke[2] | | Tensile Strength[3] | Density in Lb./Cu. Ft. | Permeability || Chemical Resistance, p.s.i. after 30 days' immersion |||
| | | | | | | | | Water[4] | Air[5] | Water 100° C. | 20% HCl[6] 110° C. | 10% NaOH[6] 25° C. |
| 7 | 16.21 | 1.30 | 17.5 | 65.0 | | 712 | 72.5 | 98.2 | 2.0 | 682 | 414 | 696 |
| 8 | 21.7 | 1.8 | 9.6 | 66.9 | | 993 | 73.5 | 63.5 | 3.88 | 826 | 648 | ND |
| 9 | 19.0 | 1.7 | 3.7 | 75.6 | | 617 | 62.7 | 116.8 | 1.94 | 549 | 368 | 664 |
| 10 | 17.9 | 1.56 | 0 | 80.54 | | 439.5 | 58.2 | 164.0 | 1.5 | 272 | 155 | 381 |
| 11 | 11.6 | (7) | 0.0 | 82.5 | | 485 | 56.0 | 151.8 | 1.5 | 376 | 47 | 380 |
| 12 | 11.6 | 5.9 | 17.5 | 65 | | 954 | 69.7 | ND | ND | ND | ND | ND |
| | Epoxy Resin E[8] | Resin Hardener[9] | Resin E Filler[10] | Other Aggregate | | | | | | | | |
| 13 | 14.7 | 1.2 | 19.1 | 65.0 | | 847 | 73.4 | 54.9 | 3.88 | 673 | 679 | 556 |
| 14 | 16.5 | 1.36 | 22.14 | 60.0 4-6 M Coke | | 1,126 | ND | 45.07 | 9.75 | ND | ND | ND |
| 15 | 18.9 | 1.53 | 25.2 | 54.37 16-35 M Coke | | 1,517 | ND | 0.835 | 30.1 | ND | ND | ND |
| 16 | 6.71 | 0.55 | 8.74 | 84.0 #8 Wedron Sand | | 1,123 | ND | ND | ND | ND | ND | ND |
| 17 | 6.71 | 0.55 | 8.74 | 84.0 #18 Graining Sand | | 1,191 | ND | ND | ND | ND | ND | ND |
| 18 | 9.30 | 0.76 | 12.42 | 77.5 4-6 M Acido Brick Chips[11] | | 885 | ND | 79.4 | 2.5 | 515 | 367 | 691 |
| 19 | 10.92 | 0.88 | 14.56 | 74.0 6-10 M Belden Brick Chips[12] | | 1,362 | | 18.2 | 20.19 | 744 | 569 | 700 |
| 20 | 10.92 | 0.88 | 14.56 | 74.0 6-10 M Acido Brick Chips[11] | | 1,428 | | 10.23 | 111.3 | 1,146 | 1,230 | 1,172 |
| 21 | 6.8 | 0.6 | 0.0 | 92.6 #8 Wedron Sand | | 246 | 125.6 | ND | ND | ND | ND | ND |
| 22 | 9.85 | 0.86 | 0.0 | 89.29 #8 Wedron Sand | | 1,295 | 130 | ND | ND | ND | ND | ND |
| 23 | 19.36 | 1.57 | 25.2 | 54.0 16-28 M Coke | | ND | 83.6 | 1.40 | 116.4 | ND | ND | ND |

[1] DETA is diethylenetriamine.
[2] All coke employed was calcined petroleum coke. 5-10 M means a size passing through a sieve of 5 meshes per lineal inch but retained on a sieve of 10 meshes per lineal inch for the most part.
[3] Tensile strength in lb./sq. in. after 7 days in air at 25° C.
[4] Flow of water downwardly through the disc in gallons per minute per square foot of area while maintaining a column of water directly above the disc at a constant level of 12 inches.
[5] Air pressure measured in inches of water in a manometer connected to the disc, necessary against one face of the disc to maintain zero guage pressure on the opposite face. Velocity of air striking face of disc was 103.3 cubic feet per minute per square foot of disc area.
[6] Aqueous solution.
[7] Versamid Type Hardener—Versamids are condensation products of a mixture of (1) dimerized and trimerized unsaturated fatty acids, typically linoleic, and (2) aryl and alkyl polyamines.
[8] Resin E is an epoxy resin having an epoxide equivalent weight of between about 220 and 240, a specific gravity of 1.15, and an absolute viscosity of about 925.
[9] Hardener 4 is a mixture of polyamines consisting essentially of diethyltriamine and triethylenetetramine.
[10] Resin E Filler is finely subdivided powdered carbon.
[11] Acido Brick Chips are made from acid-resistant bricks made by General Ceramics using a buff-colored shale.
[12] Belden Brick Chips are made from acid-resistant bricks made by Belden Company of Ohio red shale.

NOTE.—ND=Not Determined.

Reference to Table IV shows: that different aggregate, filler, epoxy resin, and hardening agents may be employed in accordance with the invention; that the permeability to either water or air may be satisfactorily controlled by the practice of the invention to meet desired specifications of permeability; that the composition of the invention exhibits excellent resistance to the corrosion of such liquids as boiling water and acidic and caustic aqueous solutions; that high tensile strength is attained in the cast resinous filter medium of the invention; that the composition of the invention is useful as a permeable medium with or without the presence of finely subdivided filler but that the presence of the finely subdivided filler clearly improves the permeability of the composition.

The examples clearly demonstrate the advantages of the composition and articles made therefrom over heretofore known compositions employed as a filter medium.

Having described my invention, what I claim and desire to be protected by Letters Patent are:

1. A moldable self-settable composition capable of hardening to a fluid-permeable thermoset composition consisting essentially by weight of an intimate mixture of (1) between about 40 percent and about 80 percent of an aggregate selected from the class consisting of pulverized calcined petroleum coke and pulverized carbon, said aggregate having a particle size such that not more than about 10 percent by weight is retained on a 2.5 mesh sieve and not more than about 10 percent by weight passes through a 140 mesh sieve; (2) between about 8 percent and about 45 percent of a diglycidyl ether prepared by reacting a molar excess of epichlorohydrin with 4,4′-isopropylidenediphenol in the presence of an aqueous solution of NaOH and having an epoxide equivalent weight of between 174 and 575 and containing a cross-linking agent for the oxirane groups present selected from the class consisting of diethylenetriamine, triethylenetetramine, and mixtures thereof, and polyamides prepared by condensing a mixture of (a) dimerized and trimerized unsaturated fatty acids and (b) aryl and alkyl polyamines; and (3) a finely subdivided pulverulent thickening filler selected from the class consisting of powdered carbon and powdered graphite of a size that at least about 80 percent passes through a 140 mesh sieve, in an effective amount of said filler to impart sufficient fluidity and adhesive properties to the resin, when admixed therewith, to form a substantially uniform coating thereof about the aggregate particles.

2. The rigid porous article comprising a filter medium consisting essentially of the shaped cured thermoset composition of claim 1.

3. The composition of claim 1 wherein the aggregate is calcined petroleum coke and the pulverulent thickening filler is present in an amount of between about 40 percent and about 65 percent by weight of the resin and said filler.

4. The rigid porous article comprising a filter medium consisting essentially of the shaped cured thermoset composition of claim 3.

References Cited by the Examiner

UNITED STATES PATENTS

| | | | |
|---|---|---|---|
| 2,623,023 | 12/1952 | Koroly | 260—2.5 |
| 2,670,339 | 2/1954 | Edmunds | 260—2.5 |
| 2,846,742 | 4/1958 | Wagner | 260—37 |
| 2,835,107 | 5/1958 | Ward | 260—37 |
| 2,934,452 | 4/1960 | Sternberg | 260—37 |
| 2,943,953 | 7/1960 | Daniel | 260—37 |
| 3,007,888 | 11/1961 | Mack et al. | 260—37 |
| 3,051,084 | 8/1962 | Scheibli | 260—37 |

MURRAY TILLMAN, *Primary Examiner.*

LEON J. BERCOVITZ, *Examiner.*

M. F. OELAK, G. F. LESMES, *Assistant Examiners.*